Figure 1:
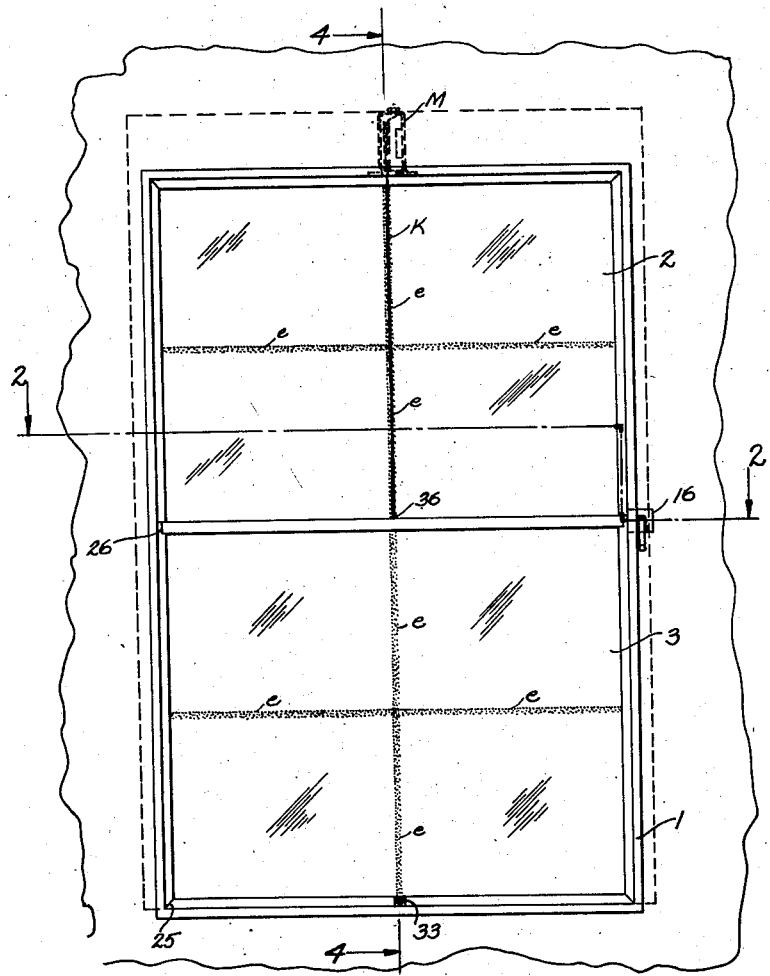

March 2, 1954     G. R. GALL     2,670,505

WINDOW

Filed Dec. 26, 1947     5 Sheets-Sheet 1

INVENTOR.
GEORGE R. GALL

BY

ATTORNEYS.

March 2, 1954     G. R. GALL     2,670,505
WINDOW

Filed Dec. 26, 1947     5 Sheets-Sheet 2

INVENTOR.
GEORGE R. GALL

BY

ATTORNEYS.

March 2, 1954 G. R. GALL 2,670,505
WINDOW
Filed Dec. 26, 1947 5 Sheets-Sheet 3

INVENTOR.
GEORGE R. GALL

BY

ATTORNEYS.

March 2, 1954 — G. R. GALL — 2,670,505
WINDOW
Filed Dec. 26, 1947 — 5 Sheets-Sheet 4
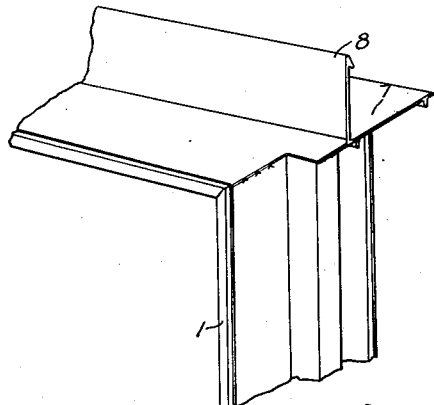
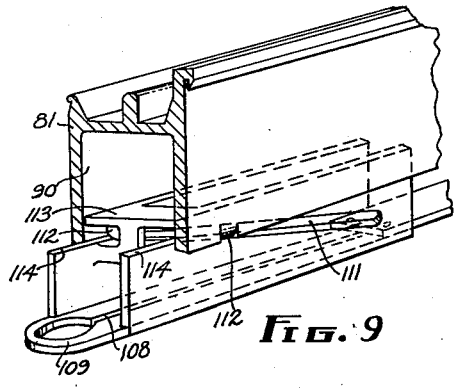
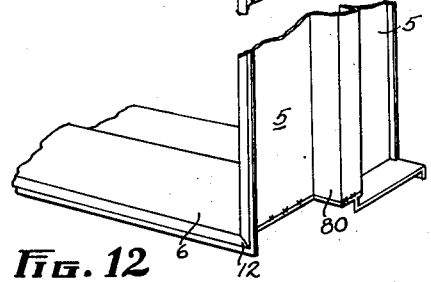
Fig. 12
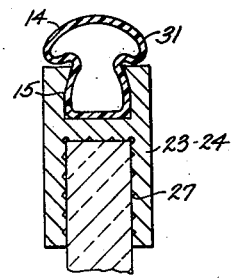
Fig. 11
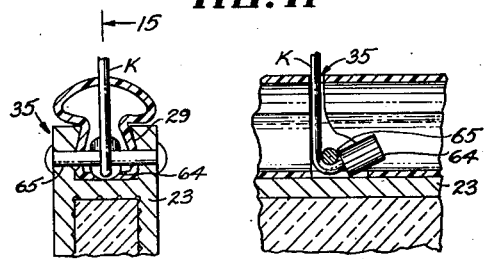
Fig. 14    Fig. 15
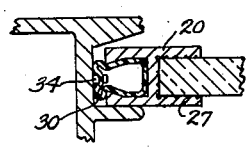
Fig. 10
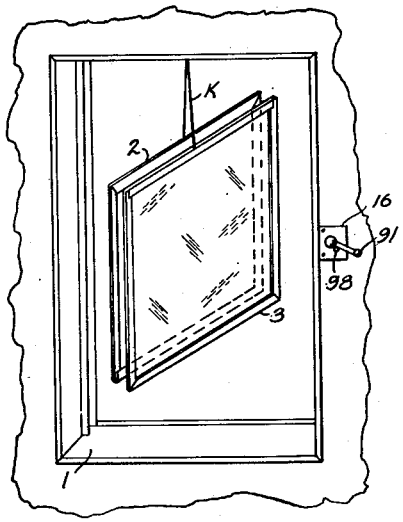
Fig. 13
INVENTOR.
GEORGE R. GALL
BY
ATTORNEYS.

March 2, 1954 G. R. GALL 2,670,505
WINDOW
Filed Dec. 26, 1947 5 Sheets-Sheet 5

INVENTOR
GEORGE R. GALL
BY
ATTORNEYS

Patented Mar. 2, 1954

2,670,505

UNITED STATES PATENT OFFICE 2,670,505

WINDOW

George R. Gall, Cleveland, Ohio

Application December 26, 1947, Serial No. 793,777

1 Claim. (Cl. 20—52)

This invention relates to improvements in windows having to do with sealing, cleaning, locking, sash suspension, appearance, facility of operation, installation and repair, the strength and durability therefor and to improvements in and related to the subject matter of my copending application Serial No. 606,007, filed July 19, 1945, as to which the instant application constitutes a continuation in part, now Pat. No. 2,580,166, dated December 25, 1951.

It is among the objects of my invention to provide a window of unusually attractive appearance and architectural harmony and in which the transparent parts may be easily cleaned. More specifically it is among my objects to provide a window in which sash which normally have a vertical sliding movement may be easily and quickly turned, as about a median vertical axis, to bring the outside surfaces of the sash into the positions normally occupied by the inside surfaces of the sash whereby the same may be held with all the security that the sash are normally held so that the washing of the outside surfaces may be done with all of the ease, safety, speed and facility with which the inside surfaces are normally washed in windows of known and prior constructions.

Another object of my invention is to provide a window with transversely movable jam or sash guiding means by virtue of which the sash may be gripped and held immovable in substantially any desired vertical position, freed for easy sliding vertical movement and released for freedom of movement, including such movement as rotation about a substantially vertical median axis. Another object is to provide for sealing such a window against the leakage of air or "weather" at substantially all points and particularly at substantially all points between the sash and the frame and at the parting rails of the sash. Another object is to provide an improved weather seal for employment between the parts of the sash and frame which are intended to have sliding movement with respect to each other, which seal shall not only be weather-tight but also shall have desirable anti-friction characteristics wherewith to eliminate chattering and binding of the sash in its intended sliding movement and to facilitate the free, quiet and smooth sliding movement of the sash with respect to the frame and in relation to the jambs or sash guiding parts thereof.

Another object of my invention is to provide an improved suspension and balance of the sash wherewith to eliminate sash weights, spring balancers and other such extrinsic means and devices for offsetting the influence of gravity on the sash. More particularly it is an object of my invention to provide that the sash be balanced by and against each other wherewith both sash move when movement is induced to either sash and wherewith both sash tend to repose in whatever vertical position to which they have been moved. Another more specific object is to provide that the sash be so balanced and suspended that they may be freely rotated about a median longitudinal axis when desired. Another object is to provide a sash balancing and suspension system through which the sash are suspended by a cord or flexible tension elements centrally located and running over a pulley of relatively large diameter wherewith to preserve the life of the tension element, but to guide the strands of the tension element in parallel paths desirably spaced in relation to the thickness of the sash, preferably less widely spaced in the diameter of the pulley. Another object is to provide for suspension and balance of the sash by inconspicuous means that facilitate adjustment through a desirable range of adjustment to insure satisfactory sealing of the sash with respect to the frame regardless of normal stretch of the sash cord or the wear or shrinkage or expansion of the weather sealing elements associated with the sash or frame.

Another object is to provide a frame, suited inter alia for a window having the above mentioned characteristics, in which the head of the frame is not only capable of carrying the weight and movement of the sash from a central point of support but which also may serve to do the work of a water stop and lintel supporting the load of the structure of the wall in which the window is disposed. Another object is to provide a window frame that can be integrated into and incorporated with the wall structure in which the window is disposed wherewith to become a structural load bearing and integral part of the wall whether the wall be of masonry, frame or otherwise, so that the frame will have functional exterior coaction with the wall elements while having interior coaction with the sash. Another object is to provide a window frame that eliminates the need of flashing over the head or lintel or under the sill.

Another object is to provide a completely assembled frame and window ready to install, complete even as to plaster grounds, trim, soffit, hardware and fittings.

Another object of my invention is to provide improved means for effecting the transverse movement of at least one of the jambs or sash guiding elements; to provide improved control thereof and to provide an improved operating mechanism therefor and improved means for locking the sash against tampering therewith or the inadvertent movement thereof.

Another object is to provide a window having enhanced light and vision as well as enhanced appearance with small, neat sash rails, unobstructed smooth frame panels, unobtrusive jambs and harmonious soffit and sill portions, all in durable, rust- and stainproof material easily cleaned and/or decorated. Another object is to provide a window in which the sash, sash suspension, seals and operating parts, i. e. all the moving and wearing parts, may be easily replaced or repaired. Another object is to provide a window that is light in weight, economical of construction and installation, long of life and satisfactory in use.

Figure 6:
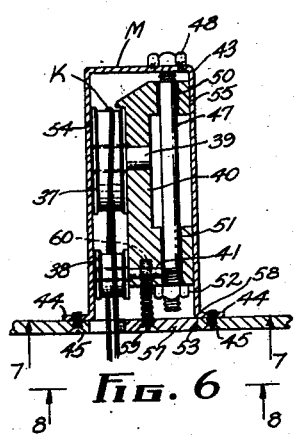
Figure 7:
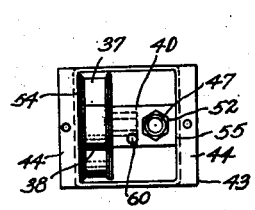
Figure 8:
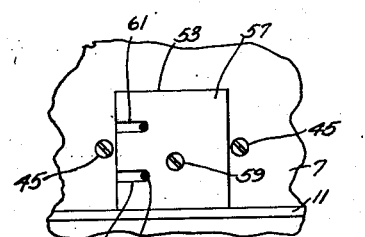
Figure 2:
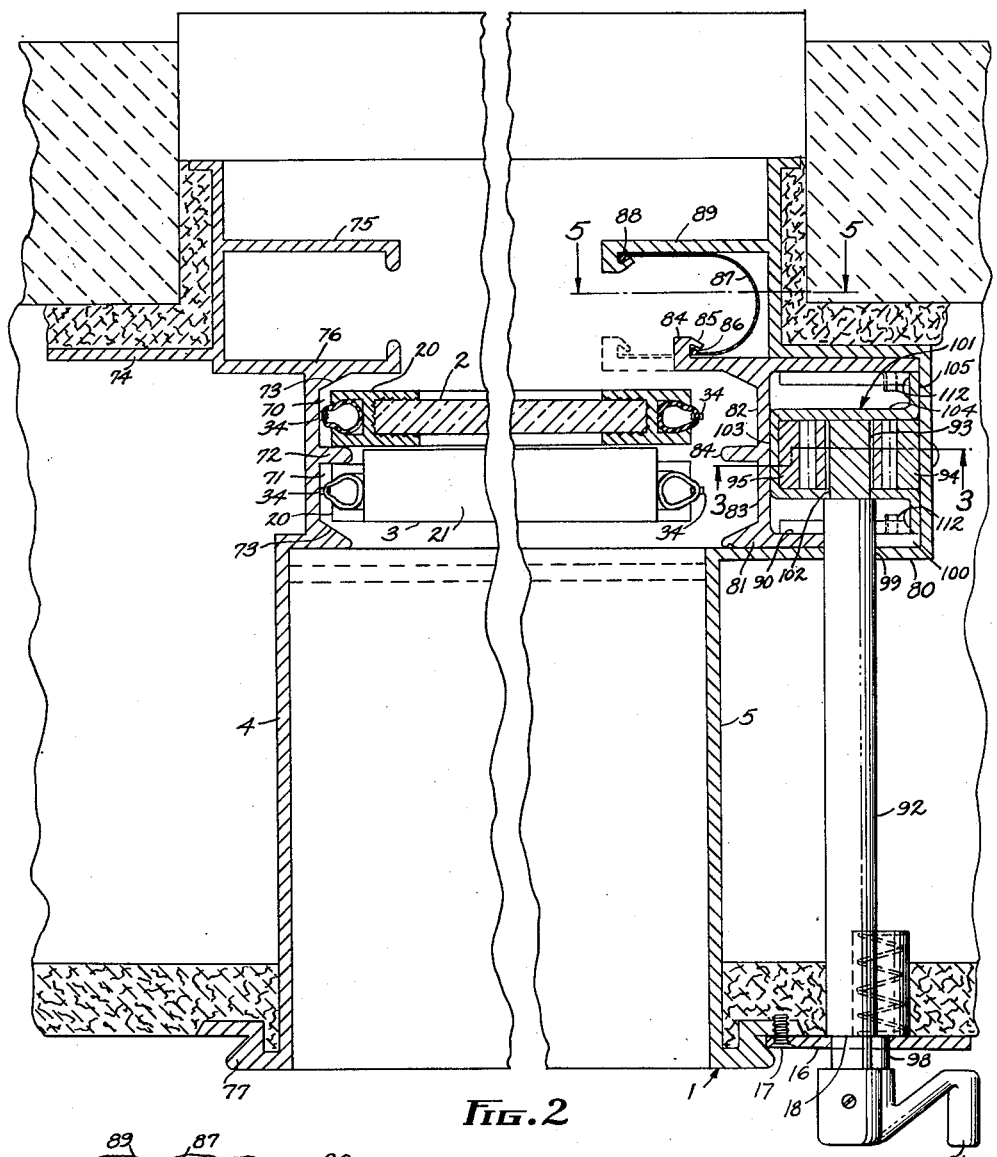
Figure 5:
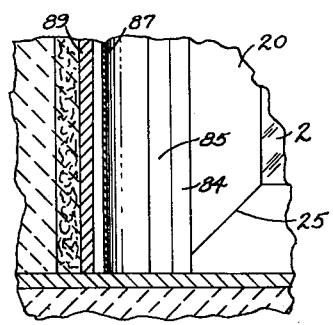
Figure 4:
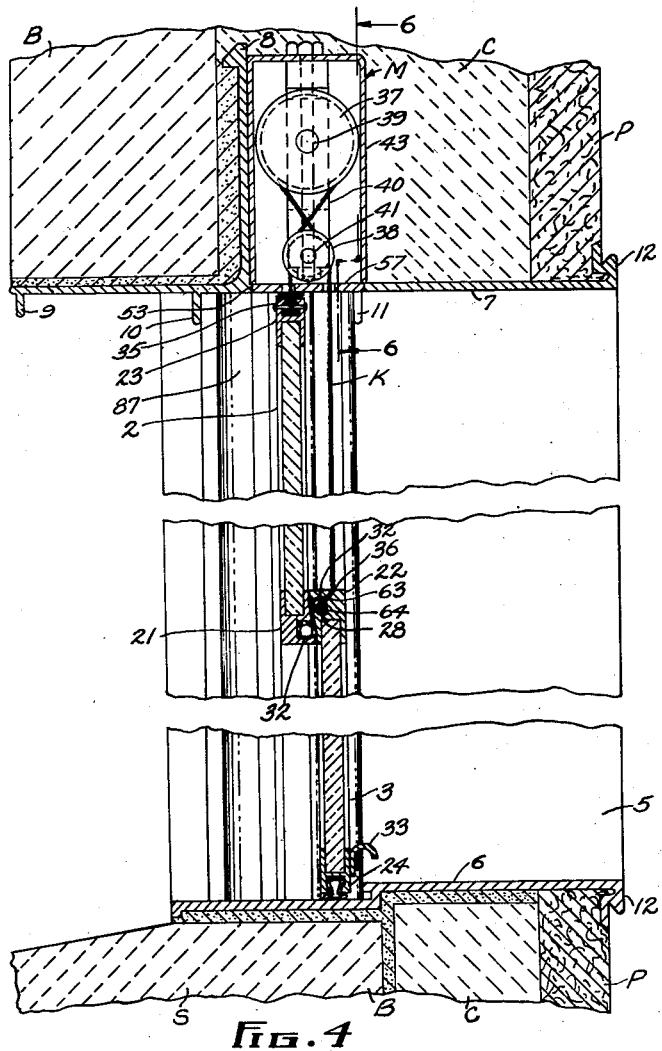
Figure 16:
Figure 3:
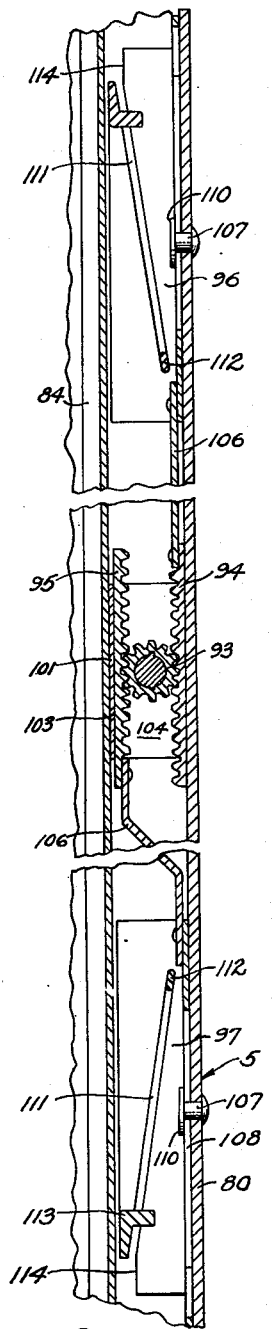
Figure 20:
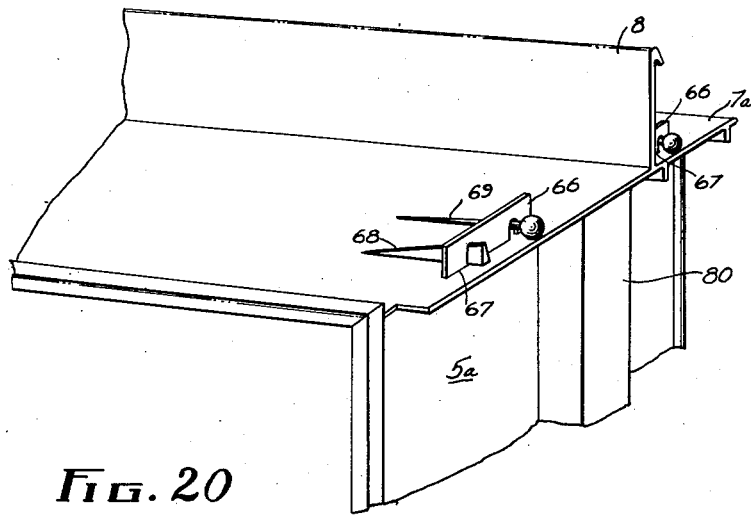
Figure 19:
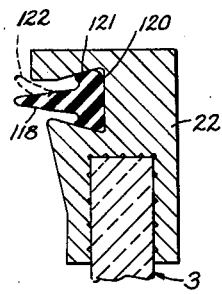
Figure 17:
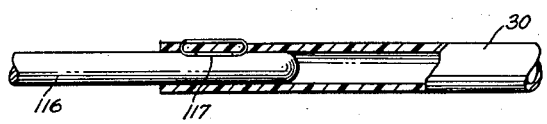
Figure 18:

Other objects and advantages will appear from the following description of a preferred form and embodiment of my invention, reference being had to the accompanying drawings in which Figure 1 is an interior elevation of my window with a fragmentary showing of the wall in which the window is disposed and incorporated; Figure 2 is an enlarged horizontal section taken along the broken line 2—2 of Figure 1 through the window and portions of the wall adjacent thereto; Figure 3 is a vertical section through the movable jamb or sash guiding element and operating mechanism therefor taken in the plane of the broken line 3—3 of Figure 2 but at approximately half the scale of Figure 2; Figure 4 is a vertical median section taken in the plane of the line 4—4 of Figure 1 on a scale substantially corresponding to the scale of Figure 3; Figure 5 is a fragmentary vertical section taken adjacent the bottom of the window in the plane of the line 5—5 of Figure 2; Figure 6 is a fragmentary vertical section showing the adjustable sash suspension mechanism taken in the broken plane of the line 6—6 of Figure 4; Figure 7 is a bottom plan view of the sash suspension mechanism as viewed in the direction of the plane of the line 7—7 of Figure 6; Figure 8 is a fragmentary view of the lower surface of the head or lintel of the window frame above which the sash supporting mechanism shown in Figures 6 and 7 is disposed, showing the closure therefor in place all as viewed from the plane of the line 8—8 in Figure 6; Figure 9 is a fragmentary perspective view partly in section showing a movable sash guiding element or jamb in operable relation to one of the actuating members therefor, also shown in Figures 2 and 3; Figure 10 is a fragmentary horizontal sectional view taken in the plane corresponding to the plane of Figure 2 showing the side edge of a sash with the seal carried thereby in sealing relation with a sash guiding element; Figure 11 is a fragmentary vertical section taken through an edge of the sash and top or bottom rail with the seal for sealing the parts in abutting rather than sliding relation; Figure 12 is a fragmentary perspective view of the window frame showing one of the side frame members with the head or lintel member and the sill member associated therewith; Figure 13 is a small scale somewhat diagrammatic perspective of my window showing the sash in free suspended position disassociated from the sash guiding elements of the window frame; Figure 14 is an enlarged transverse section of the top rail of the upper sash corresponding to Figure 11 but taken in the middle of the sash at the point of attachment of the sash cord; Figure 15 is an enlarged fragmentary longitudinal section of the same part of the mechanism as Figure 14 taken in the plane of the line 15—15 of Figure 14; Figure 16 is a side elevation partly in section of the weather sealing element shown in transverse section in Figures 2 and 10 with antifriction means associated therewith and carried thereby; Figure 17 is a view corresponding to Figure 16 and illustrates a modified form of anti-friction element for a sliding seal; Figure 18 is an enlarged transverse sectional view of a modified form of sealing element adapted for use in the parting rails; Figure 19 is an enlarged transverse fragmentary section of a parting rail of a sash with the sealing element of Figure 18 associated therewith, and Figure 20 is an enlarged fragmentary perspective of an outer upper corner of the frame of my window showing a modified form of attachment of the frame members.

In the preferred form of my invention to which the within specification is particularly directed my window comprises a rectangular frame 1, Figs. 1, 12 and 13, within which sash 2 and 3, see Figs. 1, 2, 4 and 13, are mounted for vertical sliding and other movement as will more fully appear. Preferably the frame is made of rolled or extruded aluminum or other non-corrosive metal shapes and comprises vertically extending side members 4 and 5, see Figs. 2 and 12, with their lower ends resting upon and preferably welded to a bottom or sill member 6, and in turn supporting a head or lintel member 7 to which their upper ends are preferably welded, see also Figure 4 in which the lintel and sill members are shown in section. As shown in Figures 2 and 12 the side frame members 4 and 5 are turned, angled and channelled as viewed in transverse section in Figure 2 so that when the ends thereof are cut square (and stepped at the bottom to correspond with the step of the sill, Figure 4) preparatory to being joined as by welding to the sill and lintel members the bond or joint and bearing area between the members will extend over a wide transverse dimension wherewith to give the frame rigidity against angular distortion and departure from true rectangular shape. Preferably the external dimensions of the frame correspond to even multiples of common masonry units plus their mortar joints so that the windows as a whole may be integrated directly into masonry walls; the sill resting on or at the level of one course (and partly on a stone sill S if desired) and the top surface of the lintel lying at an even multiple of courses thereabove. It may also be noted that the lintel member 7, see Figs. 4 and 12, has a large upstanding centrally disposed reenforcing flange 8 in addition to a plurality of depending flanges 9, 10 and 11 and a plaster ground flange 12. These several flanges and especially the main flange 8 give the lintel member great strength as a beam supported at its ends wherewith masonry or other wall or beam construction may be supported or poured or molded directly thereupon and the flange also serves, as shown in Figure 4, as a water stop lying behind a brick course B and in front of the back-up C and plaster P so that water tending to enter the wall above the head of the window as is commonly experienced when the window head and lintel are separate elements is prevented from so doing. Additionally the lintel member 7 in this preferred form of my invention carries about midway between its ends the pulley mechanism M, Figs. 1, 4 and 6, by which the sash are supported when released for movement as will be more fully described below; the lintel member in its especial strength and rigidity performing this extra function and the sash supporting pulley being disposed closely adjacent the main reenforcing flange 8, Fig. 4, whereby to substantially eliminate torsional deflections therein. The sill 6 is preferably stepped rather than inclined having a horizontal overhanging lip at this step to inhibit inward movement of fluid from the outward to inward parts thereof. Preferably the stepped portions of the sill are planar and parallel with the lintel and as mentioned above are disposed at right angles to the side frame members 4 and 5. The parallelism of particularly the outward portion of the sill with the juxtaposed portion of the lintel facilitates the weather seal therebetween by the squared ends of the flexible diaphragm 87, Fig. 4, as will more fully appear below.

Preferably the sash 2 and 3 are substantially equal in size and weight and each comprises a plain sheet of strong or plate glass framed and bonded within channelled side rails 20, parting rails 21 and 22 and a top rail 23 for the upper sash 2 and a bottom rail 24 for the lower sash 3; the several side, top and bottom rails being appropriately mitered as at 25, Fig. 1, for the sake of neatness and the parting rails preferably overlying the stepped ends of the side members 20 as at 26 to complete the sash frames. As shown in Figs. 2, 4, 10 and 11, the sash frame elements are deeply channelled inwardly to receive the marginal edges of the glass which is preferably bonded and positively secured therein by plastic or mastic adhesive bonding material as at 27, see Figs. 10 and 11. The side rails 20 and the extreme top and bottom rails 23 and 24 are also preferably channelled outwardly with dovetailed grooves wherein to receive and retain resilient, flexible tubular rubber-like sealing elements 30 and 31, see also Figs. 16 and 17, which are resiliently and yieldably deformable to make substantially fluid-tight seals with the window jambs and frame elements with which they have contact under sealing conditions. Preferably each of the parting rails 21 and 22, see Figs. 4 and 19, has, in addition to its glass receiving channel, a laterally facing dovetailed groove in that part of the inclined face of the parting rail near the outward edge thereof, which grooves are adapted to receive sealing elements 32 or 118, the elements 32 being similar to the elements 30, both of which by their disposition and yieldability are adapted to be deformed in the fluid-tight sealing relation with the plain continuous juxtaposed surfaces of the parting rail of the other sash when the windows are closed as shown in Figure 4. Preferably the panes of the sash are lightly etched as at $e$, Fig. 1, along narrow intersecting lines to simulate more or less conventional mullions in common use and also to enhance the illusion of concealment of the sash cord or supporting cable K which, when the windows are closed as shown in Fig. 1, extends from the center of the top of the lower sash to the middle of the lintel interiorly of and closely adjacent to the inner surface of the top sash. The light etchings $e$, however, in no way interfere with the washing of the whole surface of the pane as has been the long and common fault with sash having many small panes with mullions therebetween. As will be seen, especially in Figs. 2 and 4, the sash frame members, i. e. the rails 20—24, being preferably made of light extruded shapes of aluminum or other non-corrosive metal are not in their overall thickness greatly thicker than the panes of the glass wherewith the whole thickness of the sash is small in comparison with conventional wooden sash while the strength thereof by virtue of the thickness of the glass and the firm bond and attachment of the rails to the edges of the glass gives them great strength against breakage and all the forces intended to be imposed thereupon in their normal operation within the precepts of my invention. The thinness of the sash is also advantageously reflected in the comparative smallness and compactness of the moving parts and elements through which the sash are guided and releasably secured in use. The slenderness of the sash and particularly of its frame comprising the several rails mentioned above give neatness of appearance and lightness of weight; the latter contributing to the ease of installation and operation and correspondingly to the modest requirements for strength of the suspending cable K and to the lightness and inconspicuousness of the lifting clip 33.

In this preferred form of my invention the sash 2 and 3 are suspended from the single centrally disposed cable K, the opposite ends of which are secured respectively to the lateral midpoints of the top rail 23 of the upper sash 2 as at 35, Figs. 4, 14 and 15, and the parting rail 21 of the lower sash 3 as at 36, Figs. 1 and 4; the strands of the cable K passing through the midportion of the lintel member 7 and passing over a main pulley 37, see Figs. 1, 4, 6 and 7. Preferably the cable K takes the form of a small diameter wire rope preferably made of stainless steel, having ample strength for the load to which it is subjected and having a high enough degree of flexibility in relation to the diameter of the pulley 37 to be insured a long life without hazard of failure. As shown in Figs. 4 and 6, I prefer that the diameter of the pulley 37 be substantially greater than the thickness of a single sash, particularly where thin sash are employed wherewith to protect the cable against a short radius bend over the pulley and I, therefore, provide an idler pulley 38 below the pulley 37; the diameter of the idler pulley preferably corresponding substantially to the thickness of one of the sash so that the strands of the cable K when joined to the sash in their respective transverse midpoints will both extend substantially vertical and substantially parallel below the idler pulley. The strands of the cable cross between the idler pulley and the main pulley to effect the desired spacing and guidance above mentioned, as shown best in Figure 4. As also shown in Figure 6, the main pulley is rotatably supported on a pin 39 carried by a block 40 and the idler pulley 38 is rotatably supported on a pin 41 also carried by the block 40 in vertical alignment with the pin 39. The assembly of the two pulleys on the block 40 is housed within a housing 43 which preferably takes the form of an inverted cup preferably of rectangular cross-section, see Figure 7, and having brim flanges 44 extending away from the open bottom end thereof which rest upon and are secured to the top face of the horizontally disposed part of the lintel 7 closely adjacent the reenforcing rib 8 thereof; the housing preferably being devoid of brim flanges at least on the side adjacent the flange 8 wherewith to permit it to lie closely adjacent thereto. Screws 45 secure the housing in position on the lintel member 7, Figs. 6 and 8. A bolt 47 extends through the top wall of the housing 43 with its head 48 resting thereupon and preferably secured thereto as by welding, and the bolt 47 depends from the top wall of the housing substantially the full length thereof passing through vertically aligned apertures 50 and 51 in the block 40 in close sliding relation. The nut 52 threaded on the lower end of the bolt 47 bearing on the bottom face of the block 40 removably and adjustably retains the block 40 within the housing 43 and, upon rotation of the nut 52 on the bolt 47, raises or lowers the block 40 along with the axes of and the pulleys 37 and 38 much or little as may be desired, whereby to adjust the effective length of the cable K within a convenient and desirable range of adjustment. The lintel 7 is apertured as at 53, see also Figs. 4, 6 and 8, the aperture 53 taking rectangular form and being preferably of the same shape but slightly greater size than the interior rectangular form of the housing 43 to facilitate bodily removal of the assembly of the pulleys on the block 40 from the bolt 47 and from within the housing 43 when the nut 52 is removed from the lower end of the bolt. Preferably the pulleys 37 and 38 are freely removable from the leftward (as viewed in Fig. 6) ends of the pins 39 and 41 when the block has been removed from the housing. I prefer that the interior dimension of the housing in the direction of the axes 39 and 41, Fig. 6, be such that the leftward faces of the pulleys as there viewed are in substantially free sliding contact with the leftward vertical wall of the housing as at 54 when the block is there shown and when the rightward face of the block 40 is in free sliding contact with the interior of the opposite vertical wall of the housing as at 55, whereby the housing serves as a keeper or retainer for the pulleys with respect to the block and their bearing pins and also serves to guide and align the block and the pulleys within and in respect to the housing, the lintel, and the direction of movement of the sash and the cable.

To close the aperture 53 and the open bottom of the housing 43 I provide a plain, smooth rectangular closure plate 57, Figs. 4, 6 and 8, the edges of which closely fit the aperture 53, and which when disposed in the aperture is held with its bottom face flush with the bottom surface of the lintel 7 by virtue of its top face having edge contact with at least parts of the brim of the cup as at 58; the plate 57 being secured in place by a screw 59 passing through a central hole in the plate 57 and having threaded engagement with a deep tapped hole 60 in the bottom of the block 40. The plate 57 is slotted as at 61 and 62 to facilitate the passing of the strands of the cable K therethrough and to permit the attachment and removal of the plate whilst the cable is tautly suspending the sash.

The sash suspension above described facilitates insertion and removal or replacement of the sash as well as the cable K and the pulleys and block, and also facilitates the adjustment of the effective length of the cable and thereby the seal and fit between the top and bottom edges of the sash with the head of the sill and frame respectively with which they have sealing contact. For example, original installation of sash into the window frame, either before or after the frame is incorporated in the wall of the building, requires merely first that the cable K, being of approximately correct length, with its ends attached to the respective sash at 35 and 36 have its mid-part passed over the pulleys 37 and 38 while the latter with the block 40 are removed from the housing 43, and secondly that the block and pulleys then be inserted into the housing 43 while the nut 52 is threaded onto the bolt 47 sufficiently to retain the block 40 therein and preferably to a position of about mid-height. Thereupon the sash are permitted to take a position of free suspension, as shown in Fig. 13, and thence may be swung into the guiding channels of the jambs presently to be described in a relation of free sliding movement therewith. In the first instance, depending on the initial height to which the block 40 has been arbitrarily raised, the effective length of the cable K may be too small or too great to effect the desired sealing contact between the top edge of the upper sash with the head or lintel of the frame and the bottom edge of the lower sash with the sill. If the effective length of the cable is too little whereby one of the sash fails to make any or desirable contact, then the block 40 may be readily lowered by turning the nut 52 until the simultaneous desirable contact and seal of both sash with the upper and lower frame elements is effected. Conversely, if in the first instance the effective length of the cable is too great whereby the desired simultaneous sealing contact is not effected, the raising of the block 40 by turning the nut 52 will readily bring about the desired simultaneous contact and seal. If at any time during the life of the window the seals become worn or the cable becomes stretched an appropriate turn of the nut 52 on the bolt 47 will effect complete and expedient compensation therefor to preserve the desired seal and contact.

As best shown in Figure 4 the connection between the end of the cable K and the lower sash 3 is preferably made at the point 36 by providing a small hole 63 in approximately the exact middle of the parting rail 22 which hole leads from the top surface of the parting rail to the interior of the groove 28 wherein the seal 32 is disposed. At this point the seal is preferably severed to permit the end of the cable to be inserted through the hole 63 and through and beyond the channel 28 whereupon an enlarged sleeve 64 is squeezed or crimped or otherwise positively secured onto the extreme end of the cable so that in its contracted condition firmly engaging the end of the cable, it is too large to be withdrawn back through the hole 63. As suggested in Figure 4, the length and size of the sleeve 64 is such as to be wholly contained with the general outlines of the cross-section of the groove 28 so that it will not interfere with the sealing of the parting rails. Preferably the cable is secured in the parting rail above described before the seal 32 is disposed in the channel 28 wherefore only a small cut in the inwardly disposed part of the seal is necessary to accommodate the cable end 64 with the result that the exteriorly disposed surface of the seal may be preserved intact and continuous past the point where the cable end is disposed.

As shown in Figs. 4, 14 and 15, I prefer to secure the other end of the cable K to the top rail 23 of the sash 2 by securing a transverse pin 65 in the top rail transversely of the seal receiving channel 29 and in the substantially exact middle of that rail. The pin 65 is disposed to clear the bottom of the channel 29 by a distance approximately equal to the diameter of the cable K so that the free end of the cable may be first passed under the pin and therebeyond whereupon a crimping and gripping sleeve 64 preferably identical with the sleeve for the other end of the cable above described is securely crimped, brazed or otherwise positively attached onto the external end of the cable preventing the end of the cable from withdrawal back under the pin 65. To accommodate the cable the tubular seal member 31 is appropriately cut or severed preferably with a minimum interruption of the external sealing portion thereof so that when the sash is in the sealing relation with the lintel, as shown in Fig. 4, the sealing effect adjacent the cable will be substantially complete and perfect.

Following in general the broad teachings of my co-pending application the vertical side frame member 4 of the frame 1 is provided with a pair of parallel spaced channels 70 and 71 which guide and slidably receive the leftward (as viewed in Figs. 1 and 2) edges of the sash and particularly the side rails 20 thereof with the sealing elements 30 carried thereby. Preferably these channels are spaced by a slender vertically extending rib 72 and the walls of the channels remote from the rib are flared outwardly as at 73 to facilitate the entry and centering of the rails in or near the bottoms of the channels and to or toward contact with the rib 72 when the sash are forced into sealed and locked engagement with the channels. As shown in Figure 2, the sash are in a free sliding relation to the channels 70 and 71 and as suggested in Fig. 10 the sash upon being moved leftwardly, as viewed, cause the seals 30 to be deformed into a tight sealing relationship as will be more fully described below. The side member 4 of the frame preferably takes the form in transverse section shown in Figure 2, including the outwardly extending flange 74 and the inwardly extending flanges 75 and 76 between the latter of which is defined an inwardly facing reveal complementary to the reveal formed on the rightward side of the frame when the movable parts thereof, presently to be described, are adjusted to their closed and sash engaging position. The side frame member 4 may terminate inwardly of the window in the plaster ground trim or flange 12 for decorative advantage. Similar decorative flanges appropriately mitered or abutting are provided for the sill and lintel and other side frame member wherewith to give a continuous trim and plaster ground all around the interior face and edge of the frame.

The side frame member 5 preferably takes the form in transverse section shown in Figure 2, including a plane portion disposed inwardly of the sash terminating in a trimming flange and plaster ground as mentioned above. In the zone of the sash, Fig. 2, the member 5 takes the form of a deep vertically extending channel 80 which extends the full height of the frame, Fig. 12, and which closely and freely receives the movable jamb or sash guide member 81, see also Figs. 3 and 9, for bodily movement therein rightwardly and leftwardly as viewed in Fig. 2; the member 81 extending the full height of the frame with its ends in close free sliding contact with the head and sill, see Fig. 5. The member 81 preferably takes a multi-channelled form presenting to the sash a pair of vertically extending channels 82 and 83 spaced by a rib 84 and otherwise corresponding to the channels 70 and 71 and rib 72 with their attendant structure and disposition and ability to coact with the rightward, as viewed, vertical sash rails and seals. The leftwardly facing portion of the member 81 terminates on the side outwardly of the sash in a beaded flange 84 which in the sash engaging position of the member 81, as shown in dotted lines in Fig. 2, has a form and disposition like and complementary to the flange 76 of the member 4 and is juxtaposed thereto adjacent the outer face of the sash. The end of the flange 84 has a bendable lip 85 extending full height which is adapted to be crimped and squeezed over the beaded edge 86 of the flexible diaphragm 87 making a fluid tight joint therewith. The other edge 88 of the diaphragm 87 is similarly secured in fluid tight engagement with the end of the flange 89 which corresponds to and is juxtaposed to the flange 75 of the member 4. The diaphragm extends the full height of the frame, having its upper and lower edges in snug sliding contact with the adjacent parts of the head and the sill in substantially weather-tight relation thereto wherewith to inhibit the ingress of air or moisture beyond the diaphragm and/or toward, into or between the member 81 and the channel 80. The transverse length of the diaphragm 87, as viewed in Fig. 2, is such that the diaphragm takes a deep U-shaped configuration whereby to be freely and easily flexed in all positions of the member 81 including the fully retracted position shown in full lines and the fully advanced position suggested in the dotted lines, depicting essentially the advanced position of the flange 84 thereof. Preferably the diaphragm is made of long wearing flexible material such as synthetic rubberized fabric but, as suggested in my co-pending application, may advantageously be made of light flexible metal such as beryllium copper. It should be noted in passing that even with the edges of the diaphragm 87 tightly fixed with relation to the ends of the flanges 84 and 89 that in the absence or removal of the sash from the position shown in Figure 2 and release of the member 81 from its operating mechanism yet to be described that the member 81 may be moved bodily leftwardly entirely out of the channel 80 beyond the position suggested in broken lines in Figure 2 and, employing the diaphragm more or less as a strap hinge, the whole of the member 81 may be swung out of and away from the channel 80 to permit insertion or removal into the channel 80 of the operating mechanism yet to be described and/or to inspect or effect a substitution for or repair of the member 81. In connection with this extreme movement of removal of the member 81 from the channel 80 it is practicable to notch the depending flange 10 of the lintel to permit the swinging of the member 81 above described.

Oppositely of the channels 82 and 83 the member 81 comprises a major rightwardly, as viewed in Fig. 2, facing channel portion 90, the legs of which have close free sliding fit with the inwardly facing surfaces of the walls of the channel 80 and span the operating mechanism, see also Figs. 3 and 9, through which the member 81 is given its movement toward and away from the sash. The operating mechanism comprises the manually operable crank 91, shaft 92, pinion 93, racks 94 and 95 and inclined plane or cam elements 96 and 97 actuable by the racks and pinion and coacting with the movable jamb 81 to transmit vertical force and motion of the elements into horizontal force and motion of the jamb with large and appropriate mechanical advantage. Preferably the crank is disposed at about the level of the parting rails of the sash to make it inaccessible from within to small children and from without to prowlers. A spring pressed pin 98 preferably protrudes from the plate 16 in which the outboard end of the shaft 92 is journalled whereby to limit rotation of the shaft to one revolution, unless the pin be depressed to permit more rotation. The crank is selectively positioned on the shaft as by the set screw shown and/or by a splined connection not shown, and I prefer that the selected position of the crank on the shaft, taken with the mechanical advantage of the pinion, racks and cam members, be such that the single revolution freely permitted by the pin 98 facilitates at least such movement of the guide 81 as to release the sash from a snugly secured position to a free sliding relation in the channels 70, 71, 82 and 83 for convenient adjustment of the window openings and the re-securing of the sash in any desired position. When it is desired to "lock" the sash in a fully closed or other desired position, the pin 98 is manually depressed to permit the crank to be turned to effect a more forceful grip and lock of the sash between the guides and to render the same more burglar-proof than is ordinarily necessary. When in this condition the pin traverses the crank on the side preventing its releasing movement and it is practically impossible for an intruder to release it by any one-handed effort even though the sash are "locked" in an open position whereby one could reach the crank from the outside of the window. When it is desired to move the guide 81 to its wide open position shown in Figure 2, turning the crank more than one revolution in a releasing direction, mere manual depression of the pin 98 permits such motion and result.

The inboard part of the shaft passes through an appropriate aperture 99 in the side wall of the channel 80 of the frame member 5. A notch 100 in the near leg of the channel 90 of the movable jamb or guide member 81 facilitates movement of the latter transversely of the shaft. The pinion 93 is preferably splined to and carried by the extreme inboard end of the shaft interiorly of a rack guiding housing 101, Figures 2 and 3, in the near side wall or leg 104 of which the inboard end of the shaft may be journalled as at 102. The housing 101 preferably takes U-shaped channel form having its base 103 disposed oppositely of the base of the channel 80, its legs 104 straddling the racks 94 and 95 and guiding the same with free sliding contact with the side edges and back thereof, and having outturned feet 105 bearing on and secured to the base of the channel 80. The housing 101 is preferably about as long as shown in Figure 3, extending above and below the pinion 93 sufficiently to guide the racks from deviation from mesh with the pinion 93. As shown in Figures 2 and 3 the rack 95 has a free sliding fit with the base 103 and the rack 94 has a similar sliding contact with the base of the channel 80 when both racks engage the pinion whereby both racks are preserved in mesh and given opposite simultaneous vertical motion in response to rotation of the pinion 93.

As shown in Fig. 2 and mentioned above, the width of the housing 101 corresponds substantially to the length of the teeth of the racks and pinion, whereby the pinion even if but sloppily splined onto the shaft 92 is borne and aligned in proper mesh not only by the rack teeth but also by end contact with the inner walls of the housing. In fact it is practicable to "journal" the shaft 92 by its support in or by the pinion rather than in the housing wall as at 102 if desired. The shaft 92 is preferably shouldered near its outboard end as at 18 and removably restrained against outward movement by the plate 16 bearing against the shoulder. Inward longitudinal movement of the shaft is resisted by contact with the walls of the housing 101 by its extreme inner end and nearby shoulder respectively. As shown in Fig. 2 the shaft 92 may be quickly removed upon removal of the plate 16 whereby it is not impracticable to lock a window tight shut and then keep it inviolate by removal of the shaft if and whenever such a result is desired.

Straps 106 connect the racks respectively to the jamb actuating elements 96 and 97; the latter being guided for vertical sliding movement on the base of the channel 80 by pins 107, Fig. 3, carried by the base of the channel 80 and having their shanks extending through narrow close fitting elongated slots 108, see also Fig. 9, cut in the bases of the elements 96 and 97. The bases of said elements are also apertured at their remote ends as at 109 in extension of the slots 108 to permit the enlarged interiorly disposed heads 110 of pins to pass therethrough for assembly and removal of the elements. The elements 96 and 97 are preferably identical and are oppositely disposed in the channel 80 and between the legs of the channel 90 of the member 81, see Fig. 9, and are preferably located vertically in respect to the height of the window at about mid-height of the sash when the latter are in closed position. The elements 96 and 97 preferably take U-shaped form with their bases disposed to have sliding contact with the base of the channel 80 and constrained against departure from such contact by the enlarged heads 110 overlying the bases adjacent the slots 108. As shown in Figs. 3 and 9, the leg portions 111 of the elements 96 and 97 have elongated inclined slots cut therein which are open at or near the remote ends of the elements near the free ends of the legs and are closed at or near the proximate ends of the elements near the base portions thereof. Slightly twisted tangs 112 struck from the free or edge ends of the legs of the channel 90 enter the slots 111 through the open ends thereof when the elements are moved apart from their most proximate positions, see Fig. 9, and have a neat sliding fit in the slots whereby to impart transverse horizontal movement to the guide member 81 in response to vertical movement of the elements with high mechanical advantage according to the angle of inclination of the slots. In Fig. 3 the tangs are shown at the innermost and bottom ends of the slots, the guide member 81 having been moved from the position of Fig. 9 to that of Fig. 2. Preferably the elements 96 and 97 are cast of light metal such as aluminum, a material I prefer throughout wherever practicable, and in the casting I provide a bridge-like structure 113 spanning the open ends of the slots 111 without impairing entry of the tangs thereinto and joining the portions of the legs on opposite sides of the slots and joining the legs near the open ends of the slots to strengthen and reinforce the elements. Clockwise rotation of the pinion 93 as viewed in Fig. 3 draws the elements toward each other forcing the tangs 112 leftwardly, as viewed, and finally carrying the tangs to approximately the points 114, if the sash are first removed, at which point the guide member is free to be removed from the channel 80. Conversely the guide member may be placed in the channel 80 with its tangs 112 contacting the points 114 of the elements 96 and 97 whereupon movement of the elements away from each other as induced by counterclockwise rotation of the pinion will draw the tangs into the slots and finally to or toward the bottoms thereof as shown in Figure 3.

The guide member 81 being in the retracted position shown in Fig. 2 and the sash being suspended as shown in Fig. 13, the sash may then be freely swung to the position shown in Fig. 2 whereupon leftward movement of the guide member 81 to a position approximating the relation between channels 70 and 71 with the leftward edges of the sash will locate the sash in all the guiding channels 70, 71, 82 and 83 for free or substantially free vertical sliding movement therein subject to being secured and sealed or locked and sealed in any selected position by addition increments of leftward movement of the member 81 as the same may be forcibly induced by clockwise rotation of the crank 91.

To effect both the seal that I desire when the sash are gripped in the guiding channels and also to effect a desirable smooth, non-chattering, free sliding movement of the sash when such grip is wholly or largely released is accomplished through the tubular seals 30 in coaction with the anti-friction elements 34 or 115, Figs. 2, 16 and 17. Preferably the seals 30 are made of resiliently yielding flexible rubber-like material such as rubber, synthetic rubber or synthetic extruded plastic material in hollow tubular form having a substantial tendency to take a form circular in cross-section and of diameter greater than the narrow openings of the dovetail grooves of the side rails 20, which grooves are shallow enough in relation to the size of the seals to compel a portion of the seals to swell outwardly beyond the faces of the rails after the seals have been inserted in the grooves partially filling the same, as shown in Fig. 2. The seals 30 preferably extend substantially the full length of side rails 20 and when the channels 70, 71, 82 and 83 grip the sash the seals are yieldingly deformed, Fig. 10, against their inherent, and rather strong, tendency to persist in the shape shown in Figure 2, whereby to make a weathertight, if not a true hermetic, seal between the sash and the sash guiding members. When the sash are released for guided vertical movement in the channels 70, 71, 82 and 83, the seals in the absence of the anti-friction elements 34 or 117 being of rubber-like material with a relatively high coefficient of friction in respect to the metal of the guide channels, tend to drag and resist sliding in the channels and may cause undesirable chattering, sticking or resistance to the desired movement, perhaps especially when the sash are centrally suspended as by the central cable K.

The anti-friction devices 34 preferably are made of narrow strips of stainless steel or other metal having a low coefficient of friction in respect to the material of the guide channels and are of width materially less than the width of the openings of the grooves in which the seals are disposed and extend longitudinally of the seals whereby to be depressible below the adjacent exposed surface of the seal in the sealing position, Fig. 10, but rise above and beyond the exposed adjacent surface of the seal when the same is in its relaxed position, Fig. 2, whereby in or about the latter position the members 34 have exclusive contact with the bottoms of the guide channels and provide smooth free sliding contact with the channels without interfering with the sealing functions of the seals. I prefer that the anti-friction elements take the simple double offset form shown in Fig. 16 to facilitate quick attachment to the seals as by merely stabbing the ends of the elements through the wall of the seal or through preformed slits or apertures as at 13, Figure 16; the elements 34 preferably having sufficient resilience to admit of bending during the moment of attachment and subsequent self-straightening and positive locking engagement with the desired portion of the exposed surface of the seal to facilitate the mode of operation above described. Alternatively the elements 34 may take an initial U-shaped form and have the ends of their legs splayed outwardly within the seals as shown by forcible contact with a suitable mandrel to facilitate attachment. As many anti-friction elements 34 may be employed per sash or seal as is desirable or practicable. I prefer when using one continuous length of sealing tube 30 in each groove of each side rail 20 to employ one anti-friction element near the end of each tube as suggested in Fig. 16. I have found this sufficient in windows of household size and suggest that more anti-friction elements be employed in larger windows or in any event at or near any point in a seal that protrudes and persists in undesirable or sticking or dragging contact with the guide channels to the detriment of desirable free smooth movement of the sash. The anti-friction effect of the elements 34 is preferably such that the sash can be smoothly if not literally freely raised and lowered when the guide channels are first separated to the point where the anti-friction elements first alone have exclusive contact with the bottoms of the channels and are thus only forced into contact therewith rather lightly by the resilience of the sealing tubes. At this point the sash can be raised or lowered with little effort, and little turning of the crank 91 will be required to effect the relatively small necessary movement of the member 81. Another modest increment of separating movement of the guide member 81 correspondingly reduces or eliminates the pressure of contact between the elements 34 and the channel guides and facilitates any desired freedom of movement of the sash while retaining all desirable smoothness thereof at all times. While I prefer the narrow elongated longitudinally extending form of the members 34 and the herein illustrated means of attachment thereof to the hollow tubular sealing elements, this form is described by way of illustration rather than limitation; the general desirable characteristics of the combination being that the anti-friction element is carried on the displaceable sealing surface of the seal in a way that promotes the anti-friction element to have substantially exclusive longitudinal sliding contact with the juxtaposed member when freedom of movement is sought, but withall is so associated with the flexible sealing member as to not interfere with the sealing function thereof.

A modified form of anti-friction means is shown in Fig. 17 wherein a familiar form of staple 115 is secured to the wall of the tubular sealing element 30 preferably with the aid of a mandrel 116 which may have a flattened area 117, the ends of which in the merger with the exterior cylindrical surface of the mandrel aid the inturning of the ends of the legs of the staple when the same are driven through the walls of the sealing element into their gripping relation with the wall as shown in Figure 17. The application of such staples with commonly available stapling devices makes the attachment of the anti-friction means to the sealing element quite simple and effective. The exterior portion of the staple 115, if it takes circular wire form, as I prefer, will extend longitudinally of and slightly above the exterior surface of the member 30 for the purposes and advantages above discussed.

The seals 31 for the top and bottom rails 23 and 24 preferably take the relaxed form shown in Fig. 11 and more or less the compressed form shown in Fig. 4, in their respective free and sealing conditions. The seals 31 are preferably molded or extruded of the same or similar material as the seals 30 in substantially the form shown in Fig. 11, the upper or remote part 14 having semi-cylindrical form and the lower or near part 15 taking the form substantially corresponding to the dovetail groove in which it is disposed and self-retained by its inherent resilience. The bulk and shape of the part 14 facilitates a satisfactory seal over a rather wide range of compression and flattening under the direct manual effort of closing the window or by modest downward pressure on the clip 33, Figure 4; these seals having a desirable "softness," whereby to insure satisfactory sealing at both the head and sill of the window even though one seal should tend to be flattened somewhat more than the other, or one or both seals should tend to be flattened more at one end than the other. Moreover the softness and extent of yield of these seals between initial sealing and ultimately deformed contact protects the sash against injury from "slamming" the window shut and affords an automatic compensation against limited stretch of the cable K and/or differential thermal expansion or contraction between the cable and the frame and the sash.

The parting rail seals 32, Fig. 4, may well correspond to the cylindrical tubular seals 30 and lie in similarly proportioned dovetail grooves in the parting rails in much the same way that the seals 30 lie in the dovetail grooves in the side rails 20. As shown in Fig. 4, the parting rail grooves face horizontally, presenting the yieldable protruding parts of the seals 32 to the juxtaposed planar or inclined planar surfaces of opposite rails for sealing contact therewith as the rails become proximate when the window is closed. The seals 32 admit of desirable tolerance over which a satisfactory seal is effected in respect to the relative juxtaposed positions of the parting rails commensurate with the tolerance afforded by the seals 31.

In Figs. 18 and 19 I have shown another and preferred form of parting rail seal. As shown in Fig. 18, this modified form of seal 118 especially adapted for the parting rails takes T form in transverse section with the leg of the T preferably tapering somewhat from its point of connection with the head portion thereof and with the head portion having its ends inclined as at 119 wherewith to anchor the head more securely within the dovetail groove of the parting rail. The seal 118 may be made of extruded rubber like or plastic material characterized by its yieldability and resilience. As shown in full lines in Fig. 19 the seal 118 is disposed and secured in the dovetail groove of the parting rail 22 of the sash 33; the same being accomplished by bodily insertion there into as permitted by the flexing of the head when the same is forced through the relatively narrow opening of the groove. As the mid-portion of the head comes to its seating bearing at the bottom of the groove as at 120 the ends of the head will be stressed and distorted preferably substantially as shown at 121 wherewith to lock the head securely in the bottom of the groove against whatever forces tend to loosen or unlock it in the normal operation of the window. In situ the leg of the T protrudes beyond the opening of the groove substantially as shown and is free to be flexed as to the dotted line position as suggested at 122 under contact with the juxtaposed parting rail of the other sash. The leg of the T therefore acts somewhat as a wiping blade and due to its inherent resilience and tendency to persist in its idle position effects and maintains a firm yielding sealing contact with the other parting rail in all its deflected positions throughout the whole length thereof. The seal member 118 may be manually removed and replaced without undue manual effort preferably by a straight outward pull from the groove of sufficient force to overcome the tendency of the head to anchor itself in the bottom of the groove.

Each of the seal members above described preferably comprises a continuous length corresponding to the length of the rail with which it is associated; the seals in the side rails lying in different planes from the seals in the parting rails and not contacting directly at their proximate ends; the proximate ends of the seals in the side and bottom rails preferably being trimmed somewhat on the bias corresponding to the miter joint of the corresponding rails, preference being given the top and bottom seals as against the extreme end of the side seal to preserve the cushioning function of the top and bottom seals.

In Fig. 20 there is illustrated an alternative means and method that I have found practicable for securing the proximate ends of the frame members together and in desirably squared relation. For illustration, only the joined ends of one frame member and the lintel member are shown, but it will be understood that the same kind of mortise and tenon joint will be used at all four corners of the frame. The side frame members, such as the member 5a, correspond entirely to the members 4 and 5 respectively and have their ends squared in the same way except that one or more tenons 66 are permitted to extend beyond the squared ends thereof. The sill and lintel members, such as the lintel 7a, are mortised as at 67 to receive the tenons 66. Keepers such as the tapered key 68 or mere tenpenny nails 69 forcibly driven through approximate slots in the tenons and engaging the face of the lintel opposite the side frame member draw the parts into a tight rectangular assembly. A squaring template may advantageously be employed before the keys or nail are finally driven "home" or the sash may be installed and gripped to square the frame preferably just before the final blows are delivered to drive the keys or nails to their ultimate gripping position. The protruding parts of the tenons and keepers will be embedded in mortar (when the window is integrated into a masonry wall); the ordinary mortar bed beneath the sill of the frame receiving these parts and preferably spacing the ends of the tenons from the brick or masonry course below to avoid exclusive load bearing contact between the tenons and the wall. This method of assembling the frame facilitates "knock down shipment" and assembly on the job when that is found more advantageous than the shop welding assembly of the frame first above described. By whatever means the frame is assembled, one of the advantages of my invention is that any moderate departures from rectangularity may be largely corrected by "locking" the sash in the frame before and during the setting and integrating of the complete window in the wall whereafter the wall will contribute to holding the frame in its desired and intended rectangular shape.

Many of the advantages of my invention have been discussed in the foregoing description. The facility with which the inner and outer faces of the sash may be cleaned suggests further comment. The window being normally closed and secured in its closed position, as shown in Fig. 1, the inner surfaces of the sash are fully accessible for washing or cleaning. After the inner surfaces of the sash have been cleaned rightward movement of the movable jamb or sash guide 81 to approximately the position shown in Fig. 2 releases the sash for free bodily movement in any direction. Preferably the sash are then respectively raised and lowered to approximately mid-height and then rotated about the central vertical axis of the window, Fig. 13, the strands of the cable K crossing to be sure but freely permitting both sash to be turned "inside-out." Then preferably the member 81 is moved leftwardly whilst the edges of the sash are guided into the channels 70, 71, 82 and 83; the sash 2 taking the inner channels 71—83 and the sash 3 taking the outer channels 70—82. When the sash are received in the channels for free sliding movement they are raised and lowered respectively as far as the crossed strands of the cable K freely admit, i. e., within a couple of inches of extreme top and bottom positions. Thereupon the sash may be secured firmly in place by appropriate movement of the guide 81 and, with the outer surfaces of the sash facing inwardly, these surfaces may then be washed from within the room with all the ease, freedom and security that the inner surfaces were first washed. Although the crossed strands of the cable may impair full exposure of all the surface of one of the sash it requires merely that the sash be moved relatively vertically to an opposite upper and lower position until the obscured portion of the surface of said one sash is exposed, whereupon its cleaning is easily accomplished. Thereafter full release of the sash and the return thereof to their normal operative positions, Figs. 1 and 4, is readily done with the result that both the inner and outer surfaces will have been cleaned from within the room with the sash securely held for all cleaning operations in the most convenient and accessible position with complete facility and safety assured the housewife or operator. It will be appreciated that the central single cable suspension carried by reinforced lintel, the balanced sash, the movable jamb or guide and the operating mechanism therefor all coact to facilitate this advantage and result among others.

While I have illustrated and described a preferred form and embodiment of my invention changes, modifications and improvements will occur to those skilled in the art who come to understand or practice the precepts and examples hereof without departing from the fundamental principles of my invention, and therefore I do not care to be limited in the scope of my patent to the form or forms herein specifically illustrated and described or in any manner other than by the claim appended hereto.

I claim:

A window comprising in combination a frame, a pair of sash of substantially equal weight movable vertically in said frame, a sash cord having its ends connected to the sash respectively, said frame having a lintel portion, a pulley over which said sash cord passes carried by said lintel portion, said pulley being disposed in the middle of said lintel and the ends of said sash cord being attached to the middles of the top rails of the sash whereby the sash will hang in square vertical balanced relation when freely suspended from said pulley, and a second pulley of diameter approximately equal to the thickness of one of the sash interposed between the first pulley and the sash and spacing the strands of said cord.

GEORGE R. GALL.

References Cited in the file of this patent

UNITED STATES PATENTS

| Number | Name | Date |
|---|---|---|
| 83,626 | Goodspeed | Nov. 3, 1868 |
| 88,763 | Hines | Apr. 6, 1869 |
| 102,827 | Joyce | May 10, 1870 |
| 418,948 | Headen et al. | Jan. 7, 1890 |
| 428,643 | Smith | May 27, 1890 |
| 517,760 | Morgan | Apr. 3, 1894 |
| 589,359 | Lowry | Aug. 31, 1897 |
| 659,037 | McKinnon | Oct. 2, 1900 |
| 1,222,293 | Iman | Apr. 10, 1917 |
| 1,395,074 | Wing | Oct. 25, 1921 |
| 1,649,861 | Schneider | Nov. 22, 1927 |
| 1,745,016 | Jorss | Jan. 28, 1930 |
| 1,911,292 | Reynolds | May 30, 1933 |
| 1,914,697 | Madsen | June 20, 1933 |
| 1,962,925 | Cacciola | June 12, 1934 |
| 1,974,638 | Axe | Sept. 25, 1934 |
| 1,995,233 | Triller | Mar. 19, 1935 |
| 2,115,139 | De Nicolais | Apr. 26, 1938 |
| 2,211,473 | Lyon | Aug. 13, 1940 |
| 2,219,593 | Lang | Oct. 29, 1940 |
| 2,326,549 | Miller | Aug. 10, 1943 |

FOREIGN PATENTS

| Number | Country | Date |
|---|---|---|
| 418,099 | France | 1934 |